US011259190B2

(12) United States Patent
Lekutai

(10) Patent No.: US 11,259,190 B2
(45) Date of Patent: Feb. 22, 2022

(54) DIRECT COMMUNICATION CHANNEL BANDWIDTH RELIABILITY IN A V2X COMMUNICATION

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 21 days.

(21) Appl. No.: 15/930,278

(22) Filed: May 12, 2020

(65) Prior Publication Data

US 2021/0360414 A1    Nov. 18, 2021

(51) Int. Cl.
*H04W 16/14* (2009.01)
*H04W 4/40* (2018.01)
*H04W 28/08* (2009.01)
*H04W 76/14* (2018.01)
*H04W 92/18* (2009.01)

(52) U.S. Cl.
CPC ............ *H04W 16/14* (2013.01); *H04W 4/40* (2018.02); *H04W 28/0983* (2020.05); *H04W 76/14* (2018.02); *H04W 92/18* (2013.01)

(58) Field of Classification Search
CPC ...... G01S 7/021; H04L 27/0006; H04W 4/40; H04W 4/42–48; H04W 16/14; H04W 16/16; H04W 28/0983; H04W 72/04; H04W 72/12; H04W 76/14; H04W 84/18; H04W 92/18
See application file for complete search history.

(56) References Cited

U.S. PATENT DOCUMENTS

| 6,999,471 | B1 | 2/2006 | Frazer et al. |
| 8,913,544 | B2* | 12/2014 | Akita .............. H04W 4/44 370/315 |
| 9,763,267 | B2 | 9/2017 | Abraham et al. |
| 10,165,574 | B2 | 12/2018 | Baghel et al. |

(Continued)

OTHER PUBLICATIONS

A. K. Ligo and J.M. Peha, Speclium for V2X Allocation and Sharing, in IFFF Transactions on Cognitive Communications and Networking, vol. 5, No. 3, pp. 768-779, Sep. 2019.

(Continued)

*Primary Examiner* — Thomas R Cairns
(74) *Attorney, Agent, or Firm* — Han Santos, PLLC

(57) ABSTRACT

Techniques described herein improve direct communication channel reliability in a vehicle-to-everything (V2X) communication. The techniques include a (wireless communication) device that uses a first licensed band to perform a cellular network communication through a first interface (e.g., Uu), and further uses a shared spectrum to perform a V2X communication through a direct communication channel interface. The device then monitors and compares a bandwidth requirement of the V2X communication with a bandwidth of the shared spectrum. In response to the bandwidth that is less than the bandwidth requirement, the device selects a second licensed band that includes a bandwidth that is at least equal to the bandwidth requirement. Further, the selected second licensed band is different from the first licensed band to avoid channel interference. In other embodiments, the device uses the licensed band to directly establish the V2X communication.

20 Claims, 6 Drawing Sheets

(56) References Cited

U.S. PATENT DOCUMENTS

| | | |
|---|---|---|
| 10,349,442 B2 | 7/2019 | Baghel et al. |
| 10,383,114 B2 | 8/2019 | Jiang et al. |
| 10,477,371 B2 | 11/2019 | Gulati et al. |
| 10,548,184 B2 | 1/2020 | Obaidi |
| 10,575,083 B2 | 2/2020 | Perianu et al. |
| 10,580,291 B1 | 3/2020 | Rothenberg et al. |
| 10,757,711 B2* | 8/2020 | Lee .................. G01C 21/26 |
| 2003/0165200 A1 | 9/2003 | Pugel |
| 2004/0203815 A1 | 10/2004 | Shoemake et al. |
| 2006/0146775 A1 | 7/2006 | Song et al. |
| 2007/0064606 A1 | 3/2007 | Uh et al. |
| 2011/0228779 A1 | 9/2011 | Goergen |
| 2012/0063373 A1 | 3/2012 | Chincholi et al. |
| 2013/0203378 A1 | 8/2013 | Vos et al. |
| 2014/0162667 A1 | 6/2014 | Mueck |
| 2015/0111569 A1 | 4/2015 | Gupta |
| 2016/0234031 A1 | 8/2016 | Rabii et al. |
| 2016/0234032 A1 | 8/2016 | Rabii et al. |
| 2017/0111921 A1 | 4/2017 | Fan et al. |
| 2017/0272995 A1 | 9/2017 | Kim et al. |
| 2018/0255611 A1 | 9/2018 | Li et al. |
| 2018/0351844 A1 | 12/2018 | Viox et al. |
| 2020/0145293 A1* | 5/2020 | Terazawa .............. H04L 47/822 |
| 2020/0196325 A1 | 6/2020 | Patil et al. |
| 2020/0245115 A1* | 7/2020 | Dorrance ............. G08G 1/0141 |
| 2021/0089026 A1* | 3/2021 | Bender ................. G08G 1/012 |

OTHER PUBLICATIONS

U.S. Appl. No. 16/890,855, Office Action dated Jul. 20, 2021, 26 pages.

U.S. Appl. No. 15/930,286 Notice of Allowance dated Sep. 2, 2021, 53 pages.

U.S. Appl. No. 15/930,286, Notice of Allowance dated Sep. 15, 2021, 6 pages.

U.S. Appl. No. 16/890,855, Notice of Allowance dated Sep. 10, 2021, 17 pages.

U.S. Appl. No. 16/890,855, Notice of Allowance dated Sep. 17, 2021, 10 pages.

* cited by examiner

| | LF Area 208 | MF Area 206 | HF Area 204 | Uu 250 (Licensed Band) | PC5 Interface 260 (Licensed Band) |
|---|---|---|---|---|---|
| 310 — 1ST DEV. 232<br>2ND DEV. 242 | Yes 312<br>Yes 314 | No<br>No | No<br>No | LF<br>LF | HF or MF Licensed Band 316 |
| 320 — 1ST DEV. 232<br>2ND DEV. 242 | Yes 322<br>Yes | No<br>Yes 324 | No<br>No | LF<br>LF/MF | HF Licensed Band 326 |
| 330 — 1ST DEV. 232<br>2ND DEV. 242 | Yes<br>Yes 332 | Yes 334<br>No | No<br>No | LF/MF<br>LF | HF Licensed Band 336 |
| 340 — 1ST DEV. 232<br>2ND DEV. 242 | Yes<br>Yes | Yes 342<br>Yes 344 | No<br>No | LF/MF<br>LF/MF | HF Licensed Band 346 |
| 350 — 1ST DEV. 232<br>2ND DEV. 242 | Yes<br>Yes | Yes 352<br>Yes | No<br>Yes 354 | LF/MF<br>LF/MF/HF | Maintain 5.9 GHz 356 |
| 360 — 1ST DEV. 232<br>2ND DEV. 242 | Yes<br>Yes | Yes<br>Yes 362 | Yes 364<br>No | LF/MF/HF<br>LF/MF | Maintain 5.9 GHz 366 |
| 370 — 1ST DEV. 232<br>2ND DEV. 242 | Yes<br>Yes | Yes<br>Yes | Yes 372<br>Yes 374 | LF/MF/HF<br>LF/MF/HF | Maintain 5.9 GHz 376 |
| 380 — 1ST DEV. 232<br>2ND DEV. 242 | Yes 382<br>Yes | No<br>Yes | No<br>Yes 384 | LF<br>LF/MF/HF | No V2X Comm. 386 |
| 390 — 1ST DEV. 232<br>2ND DEV. 242 | Yes<br>Yes 392 | Yes<br>No | Yes 394<br>No | LF/MF/HF<br>LF | No V2X Comm. 396 |

FIG. 3

DIRECT COMMUNICATION CHANNEL BANDWIDTH RELIABILITY IN A V2X COMMUNICATION

BACKGROUND

Vehicle communication systems may include vehicle-to-everything (V2X) communication software or programs that can facilitate transmission of information from a vehicle to any entity that may affect the vehicle and vice versa. V2X communication software generally resides at least partially in a memory unit of a vehicle's native computing system such as a vehicle's electronic control unit (ECU) and enables the vehicle to act as a communication node when communicating with various entities. For example, vehicles can communicate with other vehicles, infrastructures (e.g., traffic lights), passengers and/or pedestrians with mobile devices, networks, and/or so forth. Thus, V2X communication can include components such as vehicle-to-vehicle (V2V), vehicle-to-infrastructure (V2I), vehicle-to-pedestrian (V2P), and vehicle-to-network (V2N) communications.

A vehicle's native computing system may operate to support one or more V2X communication components. For example, the vehicle's ECU (or device) may perform V2V and V2P communications at the same time. In another example, the device may implement the V2V communication that includes autonomous driving and/or platooning with another vehicle. In these examples, the V2X communication may require specific capabilities or features to be successful, such as minimum requirements regarding reliability, latency, and the like. The reliability and latency requirements may in turn require use of wireless communication interfaces that can support higher channel bandwidth, reduced channel interference, etc.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

FIG. 3 is a block diagram showing a look-up table (LUT) for selecting a licensed band for the V2X communication.

DETAILED DESCRIPTION

Figure 1:
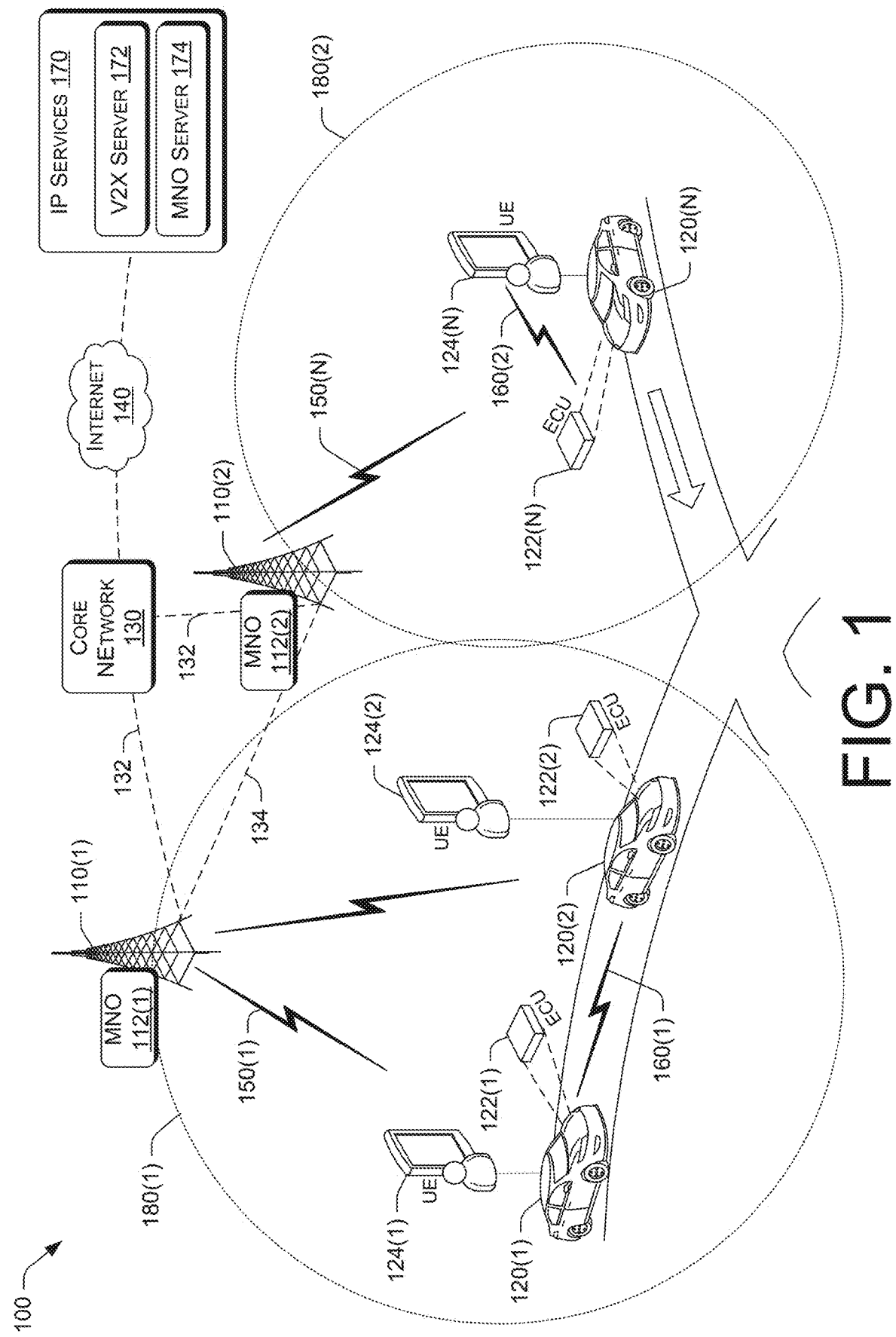
FIG. 1 illustrates an example of a network architecture that facilitates V2X communications between vehicles equipped with wireless communication devices, and between the vehicles and other wireless communication devices.

This disclosure is directed to techniques for improving bandwidth reliability in a direct communication channel that facilitates V2X communications directly between vehicles equipped with wireless communication devices, and/or between the vehicle that is equipped with the wireless communication device and other wireless communication devices or UEs, without communicating through a wireless telecommunications network base station. A general purpose for the V2X communication is to enable vehicles (with corresponding embedded wireless communication devices) to transmit and/or receive voice, data, and other types of content. To support an increasing amount of transmitted/received voice, data, and other types of content, the embedded wireless communication device may increase bandwidth of the direct communication channel to achieve higher data throughput. In an embodiment, the embedded wireless communication device increases the bandwidth of the direct communication channel by using a licensed band of a vehicle's wireless telecommunications network service provider (WTNSP) or Mobile Network Operator (MNO). In this embodiment, the use and/or availability of the licensed band may provide handy options for the embedded wireless communication device to increase the effective bandwidth of the direct communication channel. Increasing the direct communication channel bandwidth by purchasing licensed or unlicensed (frequency) bands is expensive and, in this regard, the use of the licensed band of the device's network provider may provide savings of valuable resources on the part of a network subscriber.

V2X communication may encompass two separate interfaces. V2X communication may use a first interface such as, for example, a Long Term Evolution (LTE) interface (Uu) for cellular network communications with the WTNSP or MNO. V2X communication may also use a second interface such as, for example, an LTE V2X or new radio (NR) V2X interface (PC5 interface) for direct channel communications. In an example embodiment, V2X communication utilizes both interfaces at the same time. For example, V2N communication may use a vehicle's cellular network connection in a traditional manner over the Uu, which can serve as a logical interface between the vehicle and a base station of the WTNSP or MNO. At the same time, the vehicle may perform V2P communication through the PC5 interface. In this example, the V2P communication may use the PC5 interface independently of the V2N communication over the Uu.

In an example embodiment, a wireless communication device is integrated into a vehicle's platform as an electronic control unit (ECU) or as a portable computing system. In this embodiment, the wireless communication device is associated with a particular vehicle that performs, for example, V2X communication with another vehicle. In this example, the other vehicle may also include a separate wireless communication device that is integrated to its platform. The wireless communication device may include hardware circuit components that can process data, perform transmission and reception of data through cellular network connections and/or direct communication channels, detect device location, and the like. Further, the wireless communication device may be configured to be a subscriber of one or more MNOs or WTNSPs. The subscription may be preconfigured during vehicle manufacture and can be adjusted from time to time such as, for example, when the device changes MNOs/WTNSPs and/or adds network subscription features.

In an embodiment, a first vehicle that is equipped with a first wireless communication device initially uses a shared spectrum in the direct communication channel (e.g., via a PC5 interface) to establish V2X communication with a second vehicle that is similarly equipped with a second wireless communication device. The shared spectrum may include an unlicensed band for which the first wireless communication device may contend for access using a contention-based protocol (CBP) such as the Listen Before Talk (LBT) procedure in IEEE 802.11. The CBP procedure may be used to access the shared spectrum, which is also available for use by other wireless communication devices and/or UEs in an equally shared manner or in a prioritized manner. With the established V2X communication, the first wireless communication device may compare a bandwidth that can be supported by the use of the shared spectrum with bandwidth requirements of the established V2X communication. In a case where the bandwidth of the shared spectrum is less than the bandwidth requirements, the first wireless communication device may select a licensed band from a radio spectrum that is licensed to a first wireless communication device's MNO or WTNSP. The selected licensed band may be used to replace the shared spectrum accessed via the PC5 interface. Further, the selected licensed band may include different channel bandwidth sizes (e.g., 20 MHz, 50 MHz, 100 MHz) that can be used in the direct communication channel to increase the bandwidth of the direct communication channel.

For example, the first wireless communication device uses a 5.9 GHz unlicensed band in the PC5 interface to establish V2V, V2I, and V2P communications with the second wireless communication device, traffic light, and a passenger's UE, respectively. In this example, the first wireless communication device may contend for access of the 5.9 GHz unlicensed band using a CBP procedure such as LBT. With the established V2V, V2I, and V2P communications, the first wireless communication device may monitor the bandwidth requirements of these V2X communication components relative to the bandwidth that can be supported by the 5.9 GHz unlicensed band. In a case where the bandwidth of the 5.9 GHz unlicensed band is less than the bandwidth requirements, the first wireless communication device may select, for example, a high frequency licensed band of the radio spectrum that is licensed to the first wireless communication device's MNO or WTNSP. The selected high frequency licensed band may be used via the PC5 interface to increase the bandwidth of the direct communication channel.

In an example embodiment, the first wireless communication device directly uses the licensed band in the direct communication channel to establish V2X communication. In this embodiment, the first wireless communication device uses a CBP time threshold that includes a time limit for contending access of the shared spectrum. At the end of the time limit, the first wireless communication device may directly use the licensed band in the direct communication channel to establish and to perform V2X communication. For example, the device uses the CBP time threshold of 1 millisecond to contend access of the 5.9 GHz unlicensed band shared spectrum. When the time period of 1 millisecond lapses, the first wireless communication device stops contending access of the 5.9 GHz unlicensed band shared spectrum and the first wireless communication device directly uses the licensed band in the direct communication channel. In this example, the licensed band may partially serve as first wireless communication device's dedicated channel band to directly establish the V2X communication.

The techniques described herein may be implemented in a number of ways. Example implementations are provided below with reference to the following figures.

Example Network Architecture

FIG. 1 illustrates an example architecture of a wireless communications system such as an evolved packet system 100. The evolved packet system 100 may include base stations 110 that can be associated with MNO 112, vehicles 120 with integrated wireless communication devices 122, (passenger) UEs 124, a core network 130, internet 140, and Internet Protocol (IP) services 170 including a V2X communication server 172 and MNO service server 174. Each of the devices 122 and/or UEs 124 may connect to the base station 110 through a radio interface 150. Each of the devices 122 and/or UEs 124 may establish and/or perform V2X communications through a direct communication channel interface 160 such as the PC5 interface. Further, each of base stations 110 may provide cellular wireless communications within respective geographic coverage area 180.

Base stations 110 in the evolved packet system 100 may be collectively referred to as Evolved Universal Mobile Telecommunications System (UMTS) Terrestrial Radio Access Network (E-UTRAN) that can be connected to the core network 130 through backhaul links 132 (e.g., S1 interface). Base stations 110 may perform transfer of user data, mobility control functions such as handover and dual connectivity, inter-cell interference coordination, connection setup and release, load balancing, distribution for non-access stratum (NAS) messages, NAS node selection, paging, positioning, delivery of warning messages, detecting locations of devices 122 and/or UEs 124, and the like. Further, base stations 110 may communicate directly or indirectly with each other over a backhaul link 134 (e.g., X2 interface). The backhaul link 134 may be wired or wireless.

Base station 110 may be deployed in a network cell to cover, for example, the geographic coverage area 180. Base station 110 may use different licensed bands, a particular amount of transmitting power, a specific antenna configuration, and the like, to cover the geographic coverage area 180. The licensed bands may be taken from a radio spectrum that is licensed to the MNO 112, which can be associated with the base station 110. In an embodiment, the base station 110 is configured to support in parallel the use of the licensed band in the radio interface 150 and the use of a different licensed band in the direct communication channel interface 160. In this embodiment, the use of the different licensed band in the direct communication channel interface 160 does not interfere with the use of the licensed band in the radio interface 150.

MNO 112 may include a provider of wireless communications services to an end user including radio spectrum allocation, wireless network infrastructure, and the like. MNO 112 may own/control access to the radio spectrum license, and control elements of the wireless network infrastructure that are necessary to provide the wireless communications services to subscribers (e.g., device/UE subscribers). In an example embodiment, the MNO 112 allows the licensed band of its radio spectrum to be used in the direct communication channel interface 160. In this embodiment, the UE/device subscriber uses the licensed band in the direct communication channel interface 160 to increase the bandwidth in the direct communication channel as described herein.

Radio interface 150 may facilitate cellular network communications between the base station 110 and the devices 122 and/or UEs 124. The radio interface 150 may serve as a communication link between the base station 110 and the devices 122/UEs 124. Radio interface 150 may include uplink (UL) transmissions from the device 122/UE 124 to the base station 110 and/or downlink (DL) transmissions from the base station 110 to the device 122/UE 124. Further, the radio interface 150 may use one or more licensed bands of the associated MNO 112. For example, the base station 110 is associated with the MNO 112 that owns a radio spectrum license including 28 GHz/39 GHz high band, 2.5 GHz/3.5 GHz mid band, or 600 MHz/700 MHz low band. In this example, the base station 110 may use the different licensed bands in radio interface 150 during the UL and/or DL transmissions between the base station 110 and the devices 122/UEs 124.

Device 122 may include a wireless communication electronic device that can be installed and/or integrated into a vehicle's computing system or platform. Device 122 may include hardware circuit components that can establish V2X communication with another device and/or UE through the direct communication channel interface 160. Device 122 may also perform cellular V2X communications with another device and/or UE through the radio interface 150. In some embodiments, the device 122 is preconfigured to be a subscriber of a particular MNO such as the MNO 112. In this embodiment, the device 122 utilizes the licensed band of the device 122's MNO in a case where the bandwidth of direct communication channel is less than the bandwidth requirements of the V2X communication. In some embodiments, the device 122 is preconfigured to be a subscriber of different MNOs. In this case, the device 122 may use the licensed band of the different radio spectrums that are correspondingly licensed to the device 122's MNOs.

UE 124 can be a cellular or mobile phone, a smart phone, a session initiation protocol (SIP) phone, a laptop, a personal digital assistant (PDA), a satellite radio, a global positioning system, a multimedia device, a video device a camera, a game console, a tablet, a smart device, a wearable device, or any other similar functioning device. UE 124 may also be referred as a station, a mobile station, a subscriber station or unit, a wireless unit, a mobile device, a wireless device, an access terminal, a handset, a user agent, a mobile client, or some other suitable terminology. In some embodiments, the UE 124 uses the radio interface 150 to establish cellular network communications with another UE 124 and/or device 122. The UE 124 may also use the direct communication channel interface 160 to establish and to perform V2X communication with another UE 124 and/or device 122. In an embodiment, the UE 124 uses the licensed band of the radio spectrum, which is licensed to UE 124's network provider, in or via the direct communication channel interface 160. In this embodiment, the use of the licensed band increases the bandwidth in the direct communication channel interface 160.

Core network 130 may include one or more core network nodes that provide core network services to the devices 122 and UEs 124. Core network 130 may be an evolved packet core (EPC) network or a 5G core network that can facilitate data communications between network connected devices/UEs and the IP services 170. For example, core network 130 can provide one or more communications services (e.g., voice-over-Internet Protocol (VoIP) sessions, push-to-talk (PTT) sessions, group communication sessions, etc.) for devices 122 and/or UEs 124 that connect to the IP services 170 via the core network 130. In this example, the core network 130 may use mobility management entity (MME), serving gateway, packet data network (PDN) gateway, a home subscriber server (HSS), and other core network components to facilitate the communications with the IP services 170. MME may include hardware and/or software modules that can handle signaling related to mobility and security of E-UTRAN access. Serving gateway may deal with a user plane and can transport IP data traffic between the UE/device and the PDN gateway. PDN gateway may provide a point of interconnect between the core network and the IP services 170. HSS may include a database that include user-related and subscriber-related information. HSS may also include functionalities such as mobility management, call and session establishment support, user authentication and access authorization.

Direct communication channel interface 160 may include a direct wireless communication interface such as the PC5 interface that can connect the UEs and devices within a certain signal propagation range (e.g., within 100 meters of each other). Direct communication channel interface 160 may facilitate transmission of voice, data, and other types of content through the use of the shared spectrum or the use of the licensed band. In some embodiment, the shared spectrum and the licensed band are used alternately in the direct communication channel interface 160 depending upon the bandwidth requirements of the V2X communication, transmitting power of the device, location of the device, and the like.

IP services 170 may include an Internet, an intranet, an IP Multimedia Subsystem (IMS), and other IP services such as V2X communication services and network operator services. V2X communication services may be implemented by the V2X communication server 172 while the MNO 112 services may be implemented by the MNO services server 174.

The V2X communication server 172 may include general-purpose computers or other electronic devices that are capable of receiving input, processing the input, and generating output data. V2X communication server 172 may provide an integrated messaging and/or control of cellular V2X communications between UEs and devices using the radio interface 150. V2X communication server 172 may be operated by a telecommunications service provider such as the MNO 112. For example, the MNO service server 174, which is associated with the MNO 112, may receive output data from the V2X communication server 172. In this example, the MNO service server 174 may facilitate broadcasting of the received output data to each device and/or UE within the geographical coverage area 180 and through cellular V2X communication. The receiving device/UE may then utilize this information when performing V2X communications through the direct communication channel interface 160.

Example Operation Scenarios

In an example embodiment, the device 122(1) uses the 5.9 GHz unlicensed band shared spectrum in the direct communication channel interface 160(1) to establish (vehicle-to-vehicle) V2V communication with the device 122(2) and to establish (vehicle-to-pedestrian) V2P communication with the UEs 124(1) and 124(2). In this embodiment, the device 122(1) monitors the bandwidth requirements of the established V2V and V2P communications relative to the bandwidth that can be supported by the use of the 5.9 GHz unlicensed band shared spectrum (5.9 GHz unlicensed band may support a limited channel bandwidth of about 20 MHz). In a case where the 20 MHz bandwidth of the 5.9 GHz unlicensed band is not enough (e.g., bandwidth requirement is 50 MHz), the device 122(1) may select a licensed band from one or more licensed bands of the device 122(1)'s network provider. The selected at least one licensed band, which is used to replace the 5.9 GHz unlicensed band over the direct communication channel 160(1), includes a bandwidth that is at least equal to the bandwidth requirements of the V2V and V2P communications. Further, the selected at least one licensed band is taken from a radio spectrum of the MNO (e.g., MNO 112) to which the device 122(1) is a subscriber. Accordingly, the device 122(1) may increase the bandwidth in the direct communication channel interface 160(1) without having to purchase additional licensed or unlicensed band to increase the bandwidth channel.

In an example embodiment, the device 122(1) uses a CBP time threshold when contending access for the 5.9 GHz unlicensed band-shared spectrum to establish the V2X communication over the direct communication channel interface 160(1). In this embodiment, the device 122(1) directly uses the licensed band of the device 122(1)'s network provider when the shared spectrum is inaccessible within the CBP time threshold. In this manner, the device 122(1) may partially use the licensed band as a dedicated band to immediately establish the V2X communication.

In an example embodiment, the device 122(1) is a subscriber of different MNOs that own different corresponding radio spectrums. In this embodiment, the device 122(1) uses the licensed band of the radio spectrums that are correspondingly licensed to the device 122(1)'s network providers. For example, the device 122(1) is a subscriber of MNO 112(1) and MNO 112(2) that respectively own different radio spectrum licenses. In this example, the device 122(1) may utilize the licensed band in the MNO 112(1)'s and MNO 112(2)'s radio spectrums to increase the direct communication channel bandwidth.

In the embodiments described above, the selected licensed band that is used in the direct communication channel interface 160 is different from the licensed bands that are in use at the radio interface 150 in order to avoid channel interference as further described below.

Figure 2:
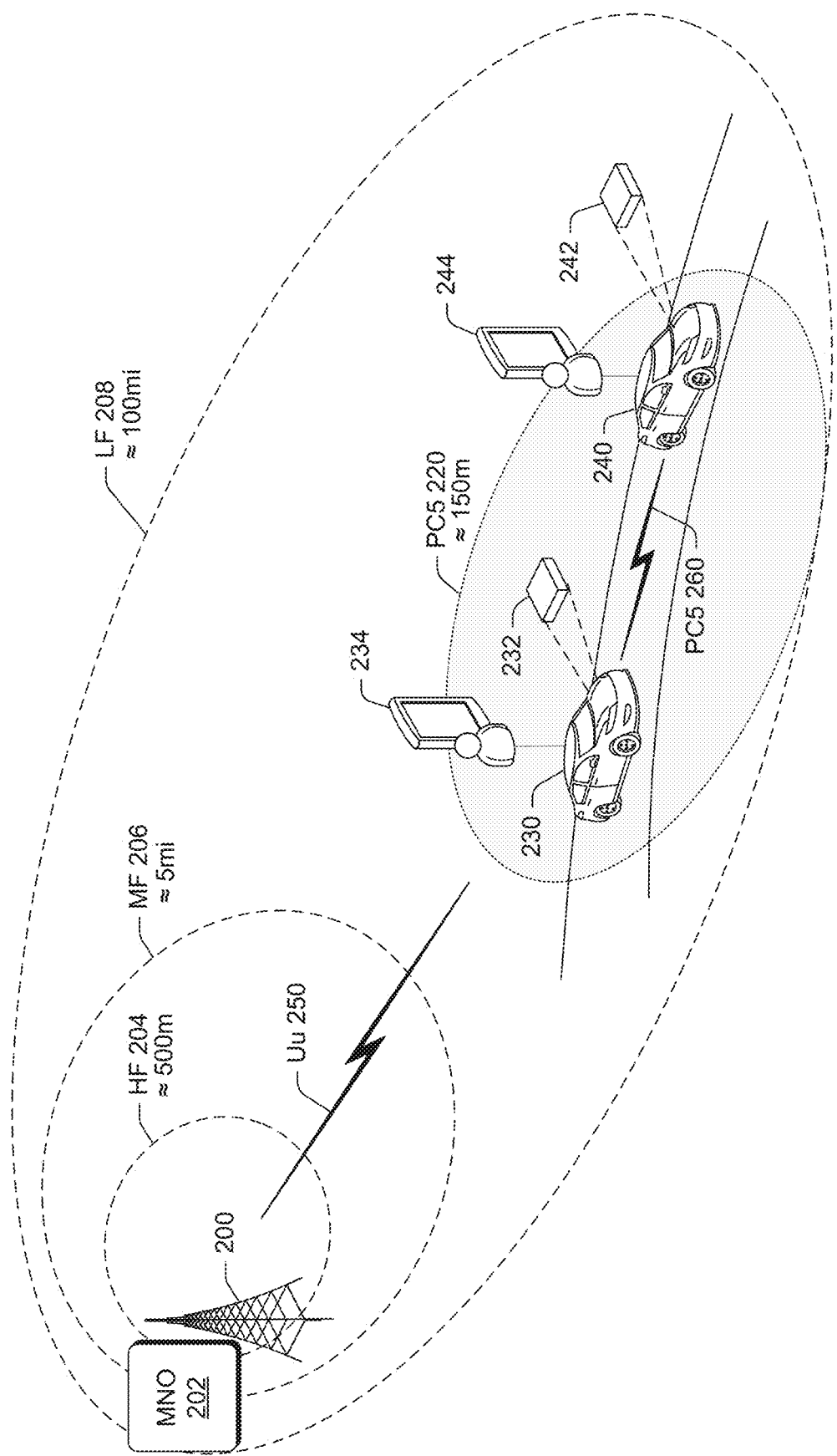
FIG. 2 is a block diagram showing direct communications between wireless communication devices and/or User Equipments (UEs) in a particular geographic coverage area of a cell network.

FIG. 2 is a block diagram showing direct communications between devices and UEs in a particular zone of the geographic coverage area. The block diagram includes a base station 200 associated with a MNO 202, a high frequency (HF) coverage area 204, a mid-frequency (MF) coverage area 206, a low frequency (LF) coverage area 208, and a PC5 coverage area 220. The block diagram also includes a first vehicle 230 including a first device 232 and a first UE 234, and a second vehicle 240 including a second device 242 and a second UE 244. The UEs (first UE 234 and second UE 244) and devices (first device 232 and second device 242) may connect to the base station 200 through a Uu 250 and/or can establish direct wireless communication with one another through a PC5 interface 260. In some embodiment, the PC5 interface 260 requires higher data throughput to support the direct wireless communication between the UEs and/or devices and in this regard, the PC5 interface 260 may use the licensed band, unlicensed band, or a combination thereof, in the PC5 interface 260 to support the bandwidth requirement of the direct wireless communication.

Base station 200 may use different radio frequencies in the Uu 250, different amounts of transmitting power, antenna configurations, and the like, to generate the HF coverage area 204, MF coverage area 206, and the LF coverage area 208. The use of high radio frequencies may reach a shorter distance due to a shorter wavelength while utilizing low radio frequencies and can cover a longer range due to longer wavelength. In an example embodiment, the base station 200 is configured to detect locations of the UEs/devices relative to each of the HF, MF, or LF coverage area. In this embodiment, the base station 200 relays the detected locations to the UEs/devices through the Uu 250.

HF coverage area 204 may include a signal propagation range or zone within a network cell (e.g., geographic coverage area 180) that can be generated by the use of HF licensed band in the Uu 250. HF coverage area 204 may include a shorter signal propagation range and can support higher channel bandwidth. For example, the base station 200 may utilize a n257 band (28 GHz) over the Uu 250. The n257 band includes the licensed band that can support different channel bandwidths such as 50 MHz, 100 MHz, 200 MHz, and 400 MHz. In this example, the use of the n257 band over the Uu 250 may provide a higher amount of channel bandwidth although the HF coverage area 204 may have a limited signal propagation range of about 500 meters from the base station 200. Different other high frequencies of different MNOs or WTNSPs may be used over the Uu 250 to generate the HF coverage area 204.

MF coverage area 206 may include another signal propagation range or zone within the network cell that can be generated by the use of a MF licensed band in the Uu 250. MF coverage area 206 may partially overlap with the HF coverage area 204. The MF coverage area 206 may include a longer signal propagation range as compared to the HF coverage area 204 and can support a different amount of channel bandwidths. For example, the base station 200 may utilize a n78 band (3.5 GHz) in the Uu 250 to generate the signal propagation range of about 5 miles along a signal propagation direction of the HF coverage area 204. The n78 band may include the licensed band that can support different channel bandwidths such as 20 MHz, 50 MHz, 60 MHz, 80, MHz, 90 MHz, and 100 MHz. In this example, the use of the n78 band (3.5 GHz) over the Uu 250 may similarly support a higher amount of channel bandwidth although the signal propagation range may be limited to a few miles from the base station 200. Different other mid frequencies of different MNOs or WTNSPs may be used over the Uu 250 to generate the MF coverage area 206.

LF coverage area 208 may include another signal propagation range or zone within the network cell that can be generated by the use of LF licensed band in the Uu 250. The LF coverage area 208 may partially overlap with the HF coverage area 204 and the MF coverage area 206. The LF coverage area 208 may include a wider and longer signal propagation range, and the use of the LF licensed band can support a lesser amount of bandwidth. For example, the base station 200 may utilize a B12 band (700 MHz) in the Uu 250 to generate a signal propagation range of about 100 miles from the base station 200. The B12 band may include one of the MNO 202's licensed bands that can support channel bandwidths such as a 5 MHz, 10 MHz, and 15 MHz. In this example, the use of the B12 band over the Uu 250 may support a limited amount of channel bandwidth although the signal propagation range may extend up to a hundred miles from the base station 200. Different other low frequencies of different MNOs or WTNSPs may be used over the Uu 250 to generate the LF coverage area 208.

PC5 coverage area 220 may include a direct communication zone or signal propagation range that can be generated by the use of the shared spectrum or the use of the licensed band in the PC5 interface 260. The use of the shared spectrum may generate a different signal propagation range as compared to the use of the selected licensed band. For example, PC5 coverage area 220 may extend to about 150 m from the transmitting device/UE when the 5.9 GHz unlicensed band is used in the PC5 interface 260. On the other hand, PC5 coverage area 220 may extend to more than 300 m from the transmitting device/UE when the selected HF licensed band (e.g., 28 GHz) is used in the PC5 interface 260. In an example embodiment, the use of the licensed band in the PC5 interface 260 is based upon the location of the device/UE within the coverage areas of the base station 200.

In this embodiment, the PC5 interface and the Uu 250 use different licensed bands of the MNO 202 to avoid channel interference.

Example Operation Scenarios

In an example embodiment, the first device 232 or second device 242 selects the licensed band to replace the shared spectrum in the PC5 interface 260 based upon their respective current locations. In this embodiment, the selected licensed band is different from the licensed band that is used over the Uu 250 to avoid channel interference. For example, the first device 232 and second device 242 that are communicating through the PC5 interface 260 are currently located outside of the HF coverage area 204 but are moving within the LF coverage area 208. In this example, the use of the 28 GHz HF band in the PC5 interface 260 does not interfere with the use of 28 GHz HF band in the Uu 250 over the HF coverage area 204.

In an example embodiment, the use of the selected 28 GHz HF band in the PC5 interface 260 is based upon device's transmitting power, the bandwidth requirements to support the V2X communication, and/or availability of the HF band selection. For example, the first device 232 uses the 28 GHz HF band to directly establish the V2X communication. In this example, the first device 232 may shift back in the process to the use of the shared spectrum (e.g., 5.9 GHz unlicensed band) to save transmission power.

In an example embodiment, the base station 200 performs the selection of the one or more licensed bands to be used in the PC5 interface 260. In this embodiment, the base station 200 uses the Uu 250 to send configurations including the selected licensed band to be used by the UEs and/or devices for the V2X communication. For example, the first vehicle 230 and the second vehicle 240 are located within the LF coverage area 208 but outside of the MF coverage area 206. In this example, the base station 200 may detect respective locations of the first vehicle 230 and the second vehicle 240 using Global Positioning System (GPS) or information gathered through Uu 250 and/or the PC5 interface 260. With the detected locations, the base station 200 may send to the first vehicle 230 and to the second vehicle 240 the particular licensed band that can be used by the embedded first device 232 and the second device 242, respectively, over the PC5 interface 260.

FIG. 3 is a block diagram showing a LUT 300 that the device can use to select the licensed band for the V2X communication. Row sections of the LUT 300 show location scenarios 310-390 including example actual locations of the first device 232 and the second device 242 over the different coverage areas in each location scenario. Column sections of the LUT 300 show the LF coverage area 208, MF coverage area 206, and the HF coverage area 204 as possible actual locations of the first device 232 and the second device 242 for each location scenario. Column sections of the LUT 300 further show "Uu 250 licensed band," which includes the licensed band that is in use at the Uu, and the "PC5 interface 260 licensed band" that includes the recommended licensed band to be selected for use in the V2X communication. In example embodiments, the UE, device, or base station uses the LUT 300 for selecting the licensed band to establish V2X communication or to replace the shared spectrum in the direct communication channel interface. LUT 300 may include a simplified reference table for illustration purposes and multiple other LUTs such as, LUTs for heterogenous networks may be utilized in a similar manner as described in embodiments herein.

Location scenario 310 includes an example scenario where the first device 232 and the second device 242 are currently located within the LF coverage area 208 as shown by "Yes 312" and "Yes 314," respectively, under the LF coverage area 208 column section. That is, the first device 232 and the second device 242 are currently located outside of the MF coverage area 206 and the HF coverage area 204. "Yes 312" and "Yes 314" in the example scenario 310 correspond to the actual locations of the first device 232 and the second device 242, respectively. In this example scenario, the "PC5 interface 260 licensed band" column section corresponding indicates the licensed band that can be selected for the V2X communication. In an example embodiment, and for the location scenario 310, the HF licensed band or the MF licensed band is used in the direct communication channel as shown by "HF or MF licensed band 316" under the "PC5 interface 260 licensed band" column section. In this embodiment, the use of the HF licensed band or the MF licensed band in the PC5 interface 260 increases the bandwidth of the direct communication channel. In some embodiments, and to avoid channel interferences for each location scenario, the licensed band selection under the "PC5 interface 260 licensed band" column section is different from the licensed band under the corresponding "Uu 250 licensed band" column section. For example, and for the location scenario 310, the V2X communication may utilize 28 GHz licensed band (as HF licensed band 316) or 3.5 GHz licensed band (as MF licensed band 316) in the PC5 interface 260 to increase the bandwidth in the direct communication channel. In this example, the use of 28 GHz licensed band or the 3.5 GHz licensed band in the PC5 interface 260 may not interfere with the use of LF licensed band in the Uu 250 because of their non-overlapping channels.

Location scenarios 320-340 include other instances where the HF licensed band may be selected under the "PC5 interface 260 licensed band" column section in order to increase the bandwidth in the direct communication channel. For example, and for location scenario 320, the HF licensed band 326 may be selected as the licensed band to be used in the direct communication channel. In another example, and for location scenario 330, the HF licensed band 336 may be selected as the licensed band to be used in the direct communication channel, and so on. In an embodiment, the selected HF licensed band may be used directly in the PC5 interface 260 or the selected HF licensed band can be used to replace the shared spectrum used in the PC5 interface 260. For example and for location scenario 320, the first device 232 is located within the LF coverage area 208 but outside of the MF coverage area 206/HF coverage area 204 as shown by "Yes 322," while the second device 242 is located within overlapping areas between the LF coverage area 208 and the MF coverage area 206 as shown by "Yes 324." In this example, the corresponding HF licensed band 326 in the PC5 interface 260 column may be selected by the device, UE, or base station to be used in the direct communication channel. In this example still, the use of the HF licensed band 326 in the PC5 interface 260 may not overlap with the use of LF licensed band and/or MF licensed band in the Uu 250.

Location scenarios 350-370 include example scenarios where the selection of the LF, MF, or HF licensed band under the "PC5 interface 260 licensed band" column section may interfere or overlap with the licensed band that is in use under the "Uu 250 licensed band" column section. In this regard, the use of the 5.9 GHz unlicensed band shared spectrum may be maintained in the direct communication channel for V2X communication.

Location scenarios 380-390 include example scenarios where the current locations of the first device and the second device may prevent establishment of the V2X communication in the direct communication channel interface. For example, and for location scenario 380, the first device is 232 is currently located within the LF coverage area 208 but outside of the MF coverage area 206/HF coverage area 204 as shown by "Yes 382," while the second device 242 is located within overlapping areas between the LF/MF/HF coverage areas as shown by "Yes 384." In this example, the distance between the first device 232 and the second device 242 may include tens of miles and in this regard, the device locations are beyond the signal propagation range for the direct communication (e.g., PC5 coverage area 220).

In an example embodiment, the LUT 300 includes licensed band selections that are specific to a particular MNO. For a different MNO that owns a different radio spectrum license, the PC5 interface 260 column of the LUT 300 may include different values of HF licensed band.

Example Device Components

Figure 4:
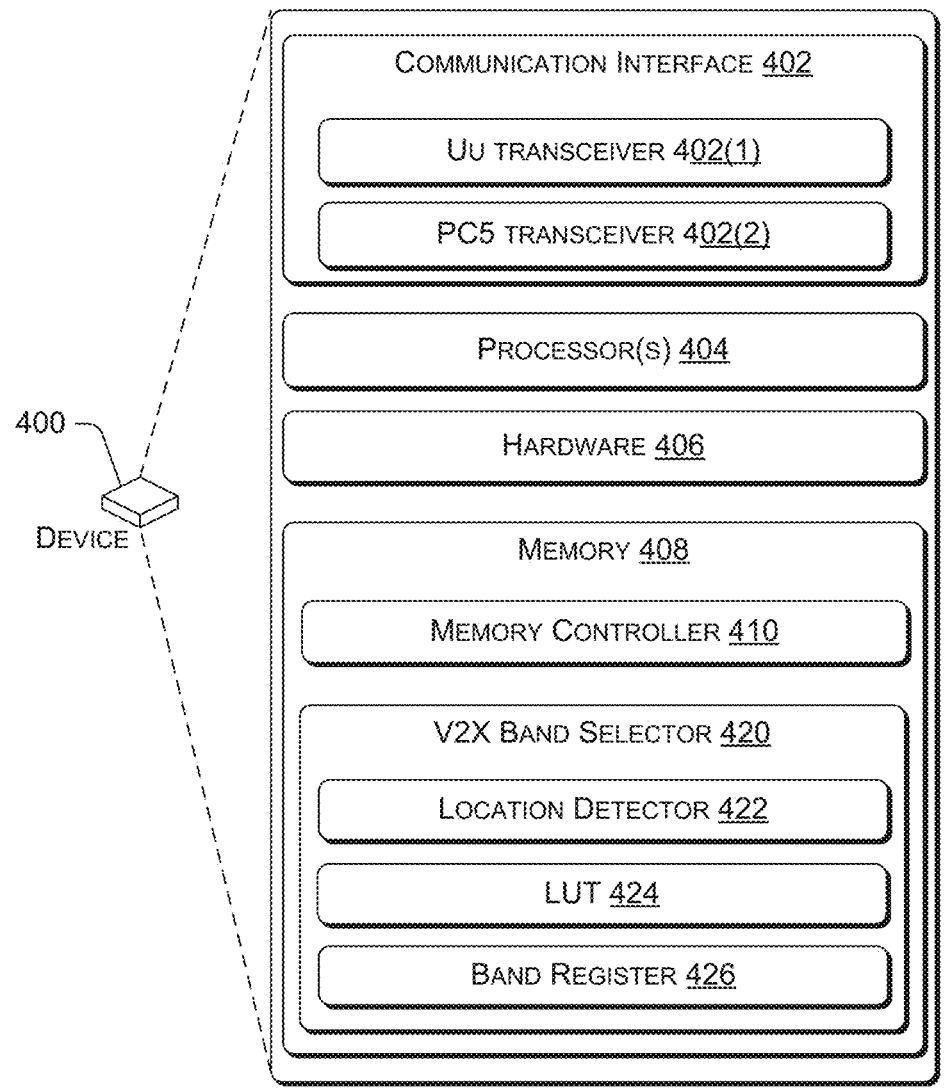
FIG. 4 is a block diagram showing various components of an illustrative device that performs the V2X communications with other wireless communication devices and/or UEs.

FIG. 4 is a block diagram showing various components of an illustrative device 400 that may be installed in a vehicle for V2X communication. It is noted that the device 400 as described herein can operate with more or fewer of the components shown herein. Additionally, the device 400 shown herein or portions thereof can serve as a representation of one or more of the devices 400 of the present system.

Device 400 may include a communication interface 402, one or more processors 404, hardware 406, and memory 408. The memory 408 may further include a memory controller 410 and a V2X band selector 420 including a location detector 422, a LUT 424, and a band register 426.

Communication interface 402 may include a hardware circuit that transmits and/or receives data from another device, UE, or base station. Communication interface 402 may include a Uu transceiver 402(1) and a PC5 transceiver 402(2) that facilitate wireless communications through the Uu 250 and PC5 interface 260, respectively. Each of the Uu transceiver 402(1) and the PC5 transceiver 402(2) may include corresponding hardware circuit components such as amplifiers, filters, equalizers, etc. that can be used to process data and/or transmit/receive data. For example, the Uu transceiver 402(1) includes hardware circuit components that facilitate cellular network communications between the device 400 and the base station 200. Similarly, in example embodiments, the PC5 transceiver 402(2) includes separate hardware circuit components that facilitate direct channel communication or V2X communication between the device 400 and another device and/or UE through the PC5 interface 260. In this example, the Uu transceiver 402(1) may operate independently of the PC5 transceiver 402(2).

Processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 404 may also be responsible for executing all computer applications stored in the memory, which can be associated with common types of volatile (RAM) and/or non-volatile (ROM) memory. The hardware 406 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer-readable storage media and communications media. Computer storage media includes volatile and nonvolatile, removable and non-removable media implemented in any method or technology for storage of information such as computer-readable instructions, data structures, program modules, or other data. Computer-readable storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 408 may also include a firewall. In some embodiments, the firewall is implemented as hardware 406 in the device 400.

Memory controller 410 may include a hardware circuit component that enables the memory 408 to interact with the communication interface 402, processors 404, hardware 406, and other components of the device 400. In some embodiment, memory controller 410 facilitates the selection of the licensed band that can be used in the PC5 transceiver 402(2). In other embodiment, the memory controller 410 receives a signal from the processors 404 to initiate processing of V2X communication data and to select the licensed band based on the processed V2X communication data. The V2X communication data may include parameters such as detected locations of the device 400 relative to signal propagation ranges, detected locations of other devices/UEs that are engaged in V2X communication with the device 400, CBP time threshold, device's transmitting power, bandwidth requirement of the V2X communication, radio spectrum of device 400's network subscription, and the like. In this other embodiment, the memory controller 410 utilizes the V2X band selector 420 to generate the selected licensed band that can be used directly or as a replacement of the shared spectrum that is presently in use at the PC5 transceiver 402(2).

V2X band selector 420 may include a hardware circuit component that selects the licensed band that can be used in the PC5 transceiver 402(2). V2X band selector 420 may receive control signal from the memory controller 410 and/or processor(s) 404 to select the licensed band. In an embodiment, the V2X band selector 420 utilizes the location detector 422 and the LUT 424 in selecting the licensed band. In this embodiment, the selected licensed band is stored in the band register 426.

Location detector 422 may include a hardware circuit component that detects present position/location and/or projected movements of the device 400 relative to different coverage areas such as the HF/MF/LF coverage areas and PC5 coverage area. In some embodiments, the location detector 422 uses the different signal propagation ranges of the base station as references for detecting the location of the device 400. For example, the location detector 422 stores the different signal propagation ranges for the LF coverage area 208, MF coverage area 206, and HF coverage area 204. In this example, the location detector 422 may use GPS to detect the location of the device 400 and to correlate the detected location and/or movements to the stored coverage areas. Similarly, the location detector 422 may store direct communication range such as the PC5 coverage area 220. In this case, location detector 422 may correlate the detected locations of communicating UEs/devices relative to the stored direct communication range.

LUT 424 may include a reference table for licensed band selection based on the detected locations of the devices within the geographic coverage area. LUT 424 may include licensed band selections that can be specific to radio spectrum of the device's network provider. In some embodiments, LUT 424 includes different licensed band selections based on radio spectrums that are licensed to corresponding different network providers. In this embodiment and during vehicle manufacture, the device 400 is preconfigured to be a subscriber of the different network providers in order to avail of the different licensed band selections. For example, a first LUT 424 includes licensed band selections for the MNO 202(1) provider while a second LUT 424 may include licensed band selections for the MNO 202(2) provider. In this example, and depending upon the device 400's MNO subscription, the device 400 may be configured to access the licensed band selections in the first and/or second LUTs.

Band register 426 may include a hardware circuit component that stores the unlicensed band or the licensed band that is in use in the PC5 transceiver 402(2). For example, PC5 transceiver 402(2) may use the 5.9 GHz unlicensed band to initially establish V2X communication. In this case, the band register 426 may store the 5.9 GHz unlicensed band as the band that is in use at the direct communication interface—PC5 transceiver 402(2). In a case where the 5.9 GHz unlicensed band is replaced by the selected licensed band, the band register 426 may store the selected licensed band as the band that is in use at the direct communication interface. In another embodiment, the device 400 updates the selected licensed band in the band register 426 to correspond with changes in the V2X communication data. In this other embodiment, the V2X band selector 420 performs a new licensed band selection, and the newly selected licensed band may be stored in the band register 426. Changes in the V2X communication data include changes in detected device location, change in device network subscription, and the like.

In an embodiment, the PC5 transceiver 402(2) initially uses the 5.9 GHz unlicensed band to establish V2X communication with another device and/or UE. The 5.9 GHz unlicensed band may be stored in the band register 426 as the band that is in use in the direct communication interface (i.e., PC5 transceiver 402(2)). In this embodiment, the processor(s) 404 continuously monitor bandwidth requirements of the V2X communication relative to the bandwidth of the stored band in the band register 426. The monitoring may include comparing the bandwidth requirements of the V2X communication with the bandwidth of the stored band (e.g., 5.9 GHz unlicensed band). In a case where the bandwidth of the stored band is lesser than the bandwidth requirement, the processor(s) 404 may request the memory controller 410 to select the licensed band that can be used in the PC5 transceiver 402(2). In this case, the memory controller 410 may use the V2X band selector 420 to generate the licensed band that can be used in the PC5 transceiver 402(2).

In some embodiments, the communication interface 402 and particularly the Uu transceiver 402(1) receives V2X communication data from the base station. For example, the base station 200 may predict handover of the device 400 from one network to another network. The base station 200 may further detect location and movement of the device 400, corresponding coverage area, and other information. In this example, the device 400 may utilize the Uu transceiver 402(1) to receive the information from the base station 200. The processor(s) 404 may process the V2X communication data, and the processed V2X communication data can be used as basis for selection of the appropriate licensed band from the LUT 424.

In some embodiment, the processor(s) 404 utilizes a CBP time threshold when the device 400 contends for access of the shared spectrum in the direct communication channel interface. At the lapse of the CBP time threshold, the processor(s) 404 may directly utilize the licensed band in the PC5 transceiver 402(2) rather than waiting continuously for availability of the shared spectrum. In this embodiment, the band register 426 is configured to store the licensed band as default stored band in the band register 426. In an example embodiment, the processor(s) 404 may monitor the availability of the shared spectrum while the licensed band is in use at the PC5 transceiver 402(2). In this example embodiment, the processor(s) 404 facilitates alternate use of the licensed band and the available shared spectrum in the direct communication channel to save transmission power in the device.

Example Process

Figure 5:
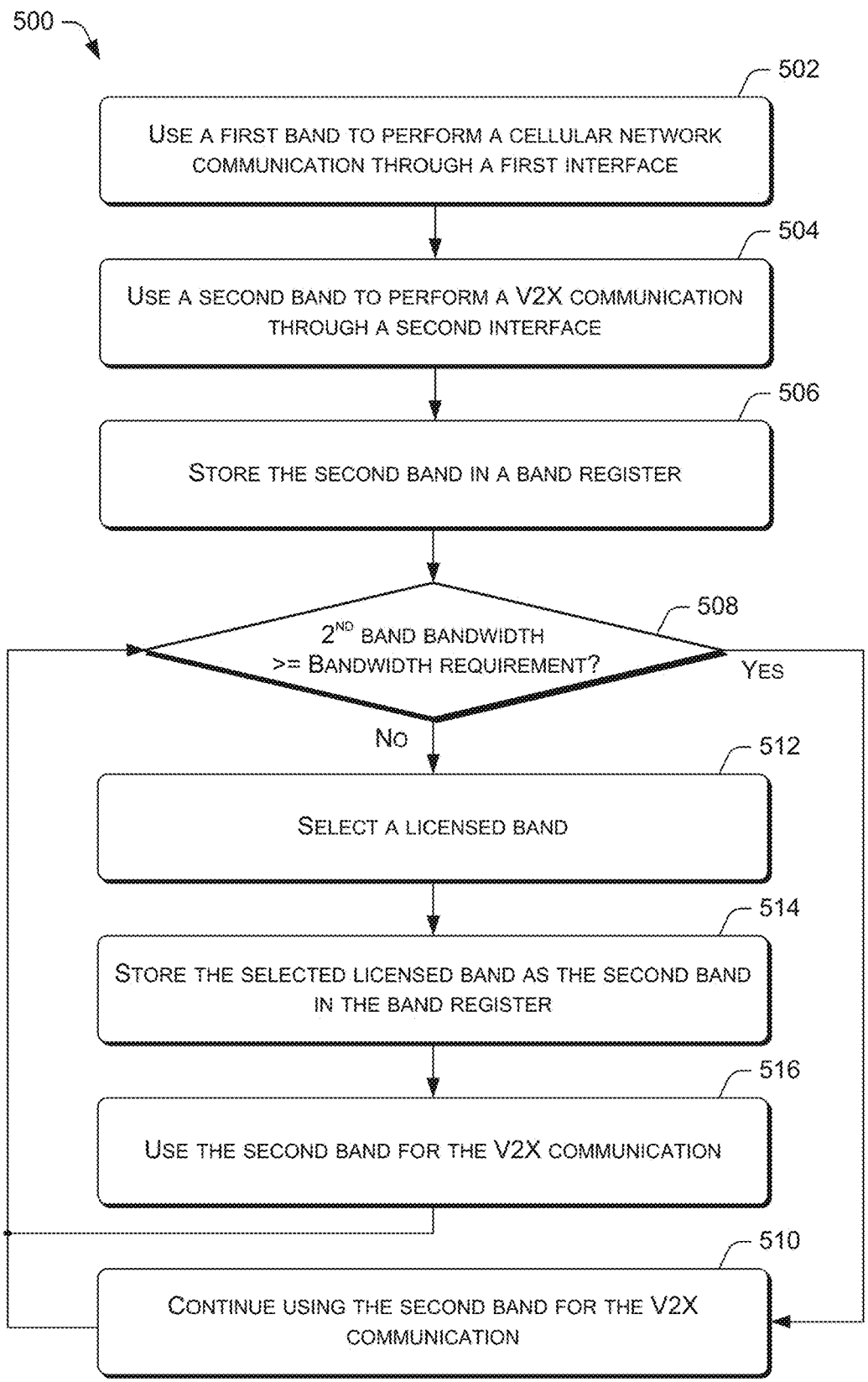
FIG. 5 is a flow diagram of an example process for improving channel bandwidth reliability in a direct communication interface.
Figure 6:
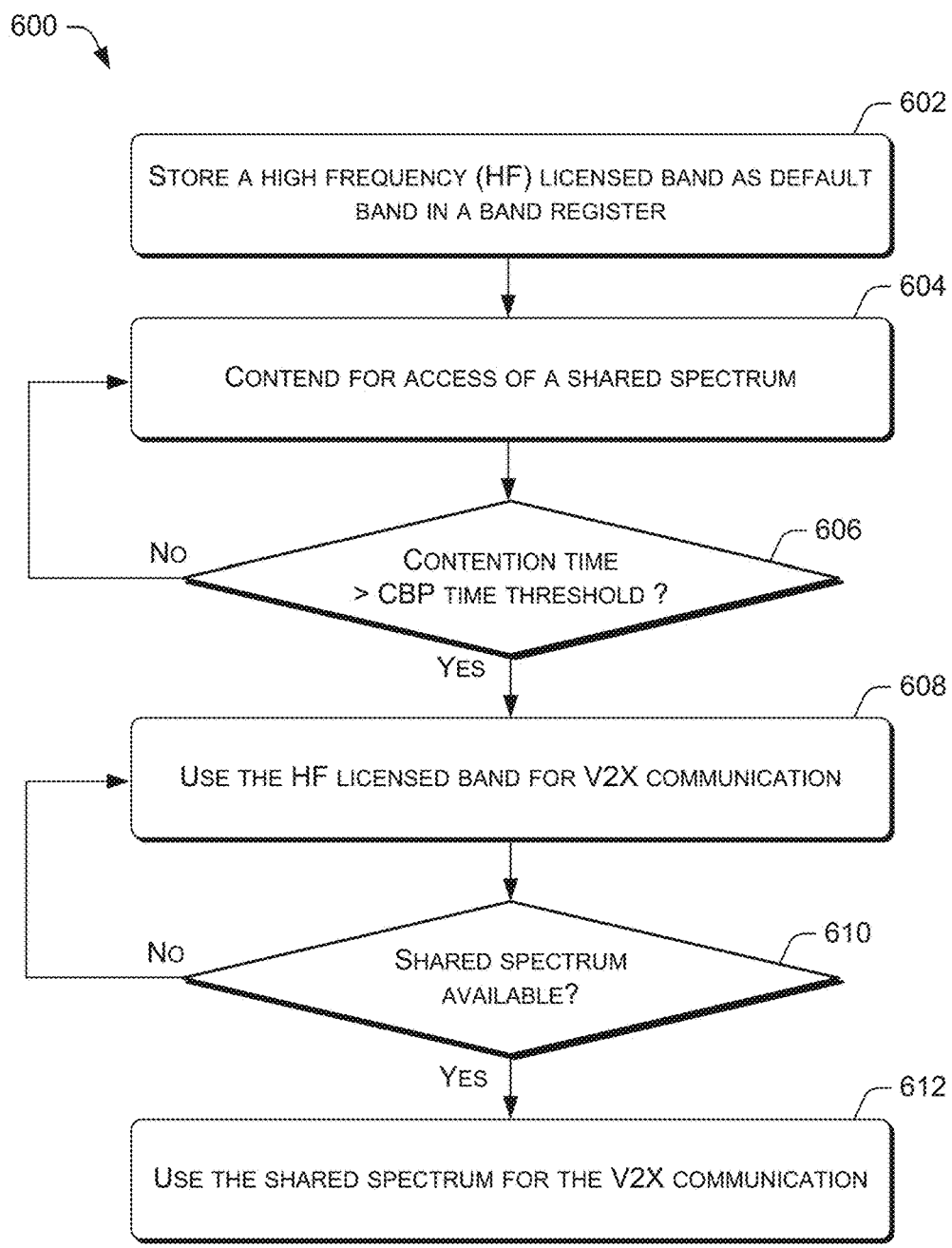
FIG. 6 is a flow diagram of an example process for improving a wireless communication device's capability to establish the V2X communication.

FIGS. 5-6 presents illustrative processes 500-600 for increasing channel bandwidth reliability in the direct communication channel to support the bandwidth requirements of the V2X communication. The processes 500-600 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-600 are described with reference to FIGS. 1-4.

FIG. 5 is a flow diagram of an example process 500 for improving channel bandwidth reliability in the direct communication interface from the perspective of the device. At block 502, using a first band to perform a cellular network communication through a first interface is performed. For example, the first device 232 may use the LF licensed band in the Uu transceiver 402(1) to establish cellular network communications with the base station 200, the first UE 234, and/or the second device 242 through the Uu 250. At block 504, using a second band to perform a V2X communication through a second interface is performed. For example, the first device 232 may use the 5.9 GHz unlicensed band shared spectrum in the PC5 transceiver 402(2) to directly communicate with the second device 242, first UE 234, and/or second UE 244 through the PC5 interface 260. At block 506, storing the second band in a band register is performed. For example, the first device 232 stores the 5.9 GHz unlicensed band in the band register 426 as the second band that is currently in use in the PC5 transceiver 402(2).

At decision block 508, determining whether a bandwidth of the second band is at least equal to a bandwidth requirement of the V2X communication. If the bandwidth of the second band (stored band) is at least equal to the bandwidth requirement ("Yes" at decision block 508), then at block 510, continuing the use of the stored second band for the V2X communication is performed. If the bandwidth of the second band is lesser than the bandwidth requirement ("No" at decision block 508), then at block 512, selecting a licensed band that includes a bandwidth that is at least equal to the bandwidth requirement of the V2X communication is performed. For example, the first device 232 utilizes the LUT 424 to select the licensed band that includes a channel bandwidth that is at least equal to the bandwidth requirements of the V2X communication. At block 514, storing the selected licensed band in the band register is performed. For example, the first device 232 stores the selected licensed band from the LUT 424 in the band register 426. In this example, the previously stored band (e.g., 5.9 GHz unlicensed band) is replaced by the stored selected licensed band. At block 516, using the selected licensed band for the V2X communication is performed.

FIG. 6 is a flow diagram of an example process 600 for improving device's capability to establish V2X communication through the direct communication channel interface. At block 602, storing a HF licensed band as default band in the band register. For example, the 28 GHz HF licensed band may be stored as the default band in the band register 426. At block 604, contending for access of shared spectrum is performed. At decision block 606, determining whether a contention time for access of the shared spectrum is greater than a preconfigured CBP time threshold. If the contention time is greater than the CBP time threshold ("Yes" at decision block 606), then at block 608, using the stored HF licensed band for V2X communication is performed. Otherwise, at block 604, continuing to contend for access of the shared spectrum is performed.

At decision block 610, determining whether the shared spectrum is available for use in the direct communication channel interface is performed. If the shared spectrum is available ("Yes" at decision block 610), then at block 612, using the shared spectrum for the V2X communication is performed. Otherwise, at block 608, continuing to use the HF licensed band for the V2X communication is performed. In an example embodiment, the use of the HF licensed band is associated with high signal transmission power. In this regard, the device may alternately use the shared spectrum (when available) to save transmission power in the device. In other embodiments, the device directly uses the stored HF licensed band in the direct communication channel interface and without contending for access of the shared spectrum in block 604.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media storing computer-executable instructions that upon execution cause one or more processors to perform acts comprising:
   using a first band to perform a cellular network communication through a first interface;
   using a second band to perform a vehicle-to-everything (V2X) communication through a second interface; and
   comparing a bandwidth requirement of the V2X communication with a bandwidth of the second band, wherein in response to the bandwidth that is less than the bandwidth requirement:
   selecting a licensed band including a bandwidth that is at least equal to the bandwidth requirement of the V2X communication; and
   using a selected licensed band as the second band for the V2X communication, wherein the second band is different from the first band.

2. The one or more computer-readable storage media of claim 1, wherein the first interface includes a Long Term Evolution interface (Uu).

3. The one or more computer-readable storage media of claim 1, wherein the second interface includes a Long Term Evolution V2X interface (PC5 interface).

4. The one or more computer-readable storage media of claim 1, wherein the second band includes a 5.9 GHz unlicensed band.

5. The one or more computer-readable storage media of claim 4 further comprising:
   storing the 5.9 GHz unlicensed band as the second band in a band register; and
   storing the selected licensed band as the second band in the band register, wherein the stored selected licensed band replaces the 5.9 GHz unlicensed band in the band register.

6. The one or more computer-readable storage media of claim 4, wherein a contending for access of the 5.9 GHz unlicensed band uses a Contention-based Protocol time threshold.

7. The one or more computer-readable storage media of claim 1, wherein the selecting further comprises:
   identifying a location of a device; and
   using a look up table (LUT) for the selecting of the licensed band that corresponds to the identified location of the device.

8. The one or more computer-readable storage media of claim 1, wherein the selected licensed band is taken from a radio spectrum that is licensed to a particular mobile network operator to which a device is a subscriber.

9. The one or more computer-readable storage media of claim 8, wherein the device is preconfigured to be a subscriber of the particular mobile network operator during a vehicle manufacture.

10. The one or more computer-readable storage media of claim 1, wherein the selected licensed band includes a high frequency licensed band.

11. A device, comprising:
    a communication interface that uses a first band to perform a cellular network communication through a first interface, and uses a second band to perform a vehicle-to-everything (V2X) communication through a second interface;
    a processor that is in communication with the communication interface, wherein the processor compares a bandwidth requirement of the V2X communication with a bandwidth of the second band; and a V2X band selector that is in communication with the processor and the communication interface, wherein in response to the bandwidth that is less than the bandwidth requirement, the V2X band selector selects a licensed band that is different from the first band in the first interface, wherein the communication interface uses a selected licensed band as the second band for the V2X communication.

12. The device of claim 11, wherein the first interface includes a Long Term Evolution interface (Uu).

13. The device of claim 11, wherein the second interface includes a direct communication interface.

14. The device of claim 11, wherein the selected licensed band includes a bandwidth that is at least equal to the bandwidth requirement of the V2X communication.

15. The device of claim 11, wherein the communication interface utilizes a 5.9 GHz unlicensed band as the second band to initially establish the V2X communication.

16. The device of claim 11 further comprising:
a location detector that identifies a location of the device; and
a look up table (LUT) that includes a reference table for the selection of the licensed band, wherein the LUT includes a licensed band selection that corresponds to the identified location of the device.

17. The device of claim 11, wherein the licensed band is taken from a radio spectrum that is licensed to a particular mobile network operator to which the device is a subscriber.

18. A computer-implemented method, comprising:
using, by a device, a first licensed band to perform a wireless communication through a first interface;
using, by the device, a shared spectrum to perform a vehicle-to-everything (V2X) communication through a second interface; and
comparing a bandwidth requirement of the V2X communication with a bandwidth of the shared spectrum, wherein in response to the bandwidth that is less than the bandwidth requirement:
using a look-up table (LUT) to select a second licensed band that includes a bandwidth that is at least equal to the bandwidth requirement of the V2X communication; and
using the selected second licensed band for the V2X communication, wherein the second licensed band is different from the first licensed band.

19. The computer-implemented method of claim 18, wherein the first interface includes a Long Term Evolution interface (Uu).

20. The computer-implemented method of claim 18, wherein the second interface includes a Long Term Evolution V2X interface (PC5 interface).

* * * * *